United States Patent
Rowe

[15] 3,637,157
[45] Jan. 25, 1972

[54] SPINNING REEL

[72] Inventor: Lacy A. Rowe, 1851 Skycoe Drive, Salem, Va. 24153

[22] Filed: July 15, 1970

[21] Appl. No.: 54,928

Related U.S. Application Data

[63] Continuation-in-part of Ser. No. 790,112, Jan. 9, 1969, Pat. No. 3,534,919.

[52] U.S. Cl. .................................................242/84.2 R
[51] Int. Cl. ......................................................A01k 89/00
[58] Field of Search..................242/84.2 R, 84.2 D, 84.21 R, 242/84.2 A, 84.21 A

[56] References Cited

UNITED STATES PATENTS

| | | | |
|---|---|---|---|
| 2,723,808 | 11/1955 | Elliott et al.................242/84.21 R X |
| 3,049,316 | 8/1962 | Isbell..................................242/84.2 D |
| 3,166,267 | 1/1965 | Rowe..................................242/84.2 R |
| 3,534,919 | 10/1970 | Rowe..................................242/84.2 R |

Primary Examiner—Billy S. Taylor
Attorney—Munson H. Lane and Munson H. Lane, Jr.

[57] ABSTRACT

A spinning reel for fishing lines, having a housing with a rotatable line pickup flier from the periphery of which the line extends generally in the direction of axis of rotation. An external yoke is pivoted to the housing for swinging movement from an inoperative position in which the bight portion of the yoke is outside the periphery of the flier and not engaged by the line, to an operative position wherein the yoke bight portion crosses the face of the flier and engages the line at an adjustable diametric distance from the inoperative position, so that oscillations of a selected amplitude are imparted to the line when the line is reeled in.

7 Claims, 3 Drawing Figures

INVENTOR
LACY A. ROWE

BY Munson H. Lane
ATTORNEY

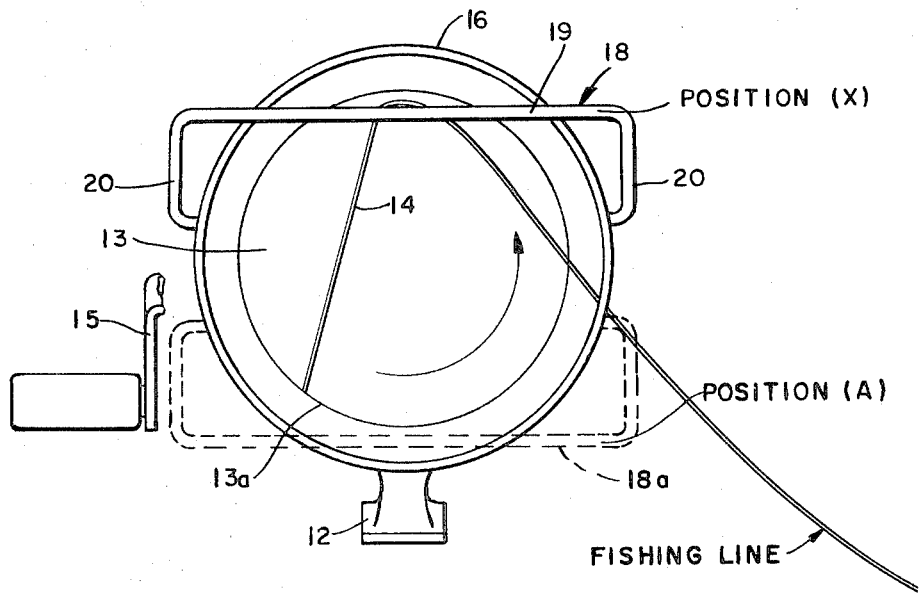

FIG. 3.

LEGEND

POSITION (A) FISHING LINE IS UNRESTRISTED FOR CASTING OUT THE LINE.

POSITION (X) LINE RETREAVING, IMPARTING OSCILLATION ON THE LINE. THE AMPLITUDE OF OSCILLATION CAN VARY WITH THE BAIL POSITIONED ANYWHERE BETWEEN POSITIONS SHOWN (A) AND (X). ZERO OSCILLATION WILL OCCUR AT POSITION (A) AND MAXIMUM OSCILLATION AT POSITION (X)

INVENTOR
LACY A. ROWE

BY *Munson H. Lane*
ATTORNEY

SPINNING REEL

This application is a continuation-in-part of my copending application Ser. No. 790,112, filed Jan. 9, 1969 now U.S. Pat. No. 3,543,919.

This invention relates to new and useful improvements in spinning wheels for fishing lines, and in particular the invention concerns itself with a spinning reel of the type having a housing with a rotatable line pickup flier from the periphery of which the line is paid out or reeled in in a direction of the axis of rotation of the flier.

The principal object of the invention is to provide such a reel with means whereby the line may be reeled in with oscillations of variable amplitude while the flier is rotated at substantially constant speed, so that a considerable amount of jerking or tugging is imparted to the line for attracting the attention of fish.

The present invention represents certain structural and functional improvements in spinning reels disclosed in my earlier U.S. Pat. Nos. 3,166,267 and 3,543,919.

An important feature of the present invention is that it is very simple in construction, capable of being applied to spinning reels of conventional type, very easy to adjust, and adaptable to economical manufacture.

With the foregoing more important object and features in view, the invention will be understood from the following description taken in conjunction with the accompanying drawings, wherein like characters of reference designate like parts, and wherein:

FIG. position; is a side elevational view of a spinning reel with the device of the invention applied thereto, the yoke of the device being shown in its inoperative position;

FIG. 3 is an end view, taken in the direction of the arrow 3 in FIG. 1 and showing the yoke in its operative position by full lines and in its inoperative position by dotted lines.

Figure 1:
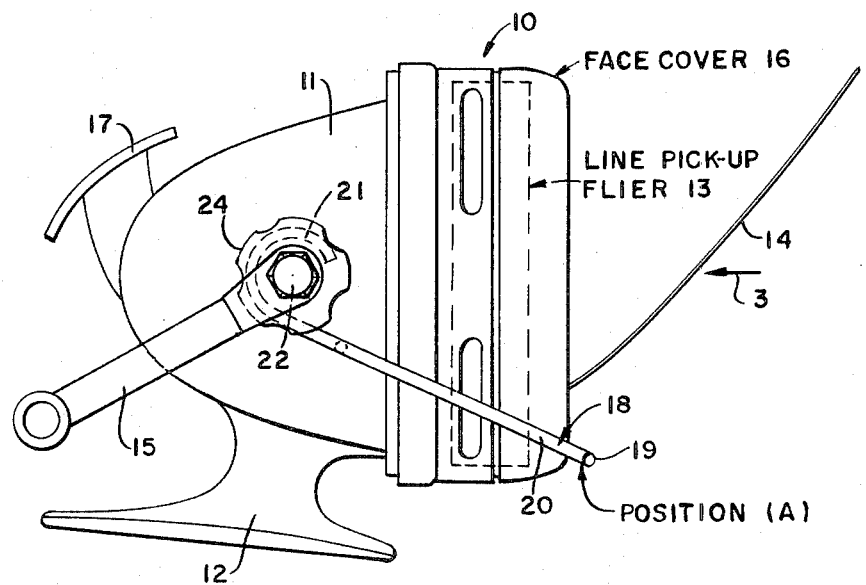

Referring now to the accompanying drawings in detail, the general reference numeral 10 designates a typical spinning reel of a conventional construction. It may be noted that the reel includes a housing 11 with a mounting base portion 12, a rotatably driven line pickup flier 13 from the periphery 13a of which a line 14 may be paid out or reeled in, generally in the direction of the axis of rotation of flier 13. The flier is cup-shaped and is rotated through suitable drive means including handcrank 15. A pushbutton 17 is provided on the housing for shifting the flier 13 to condition the reel for casting in the usual manner through an opening in face cover 16 carried forwardly of the housing 11.

Figure 2:
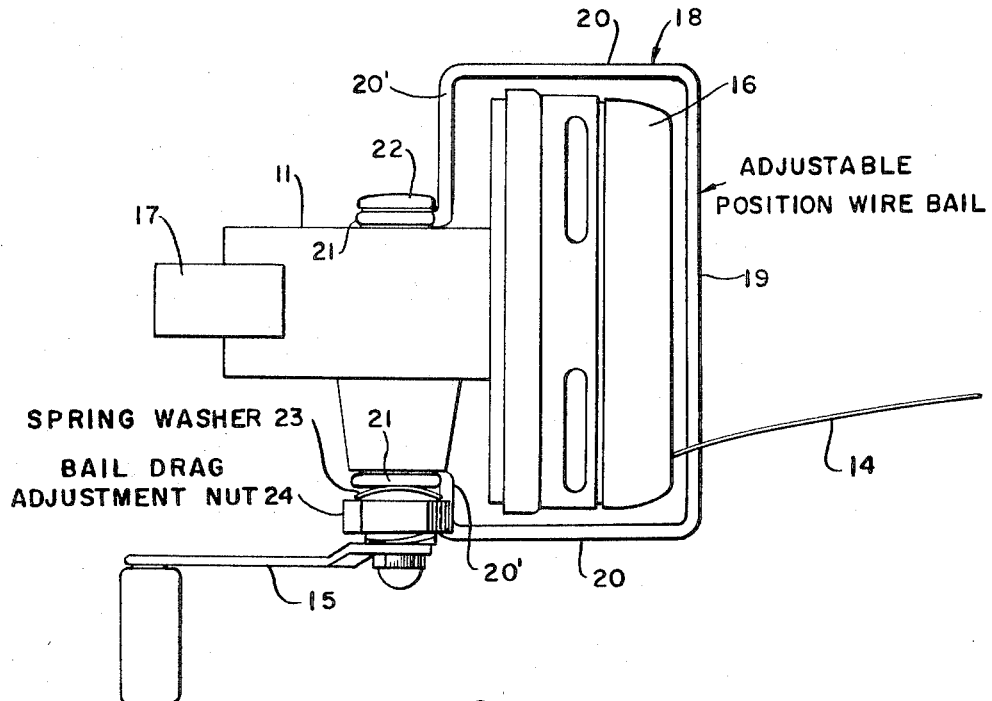
FIG. 2 is a top plan view of the subject shown in FIG. 1.

A yoke 18 has a bight portion 19 extending laterally across the front face of the reel. The opposite ends of the light portion 19 turn rearwardly, as seen in FIG. 2, forming arms 20 having deflected portions 20 extending inwardly to terminate in hook-shaped portions 21 mounted for pivotal movement on opposite sides of housing 11. The mounted of the upper arm 20, as viewed in FIG. 2, is by means of a headed stud member 22 connected to housing 11 in alignment with the axis of rotation of hand crank 15. The opposite arm 20 is pivoted about the crankshaft which has a threadedly connected nut 24 thereon which exerts pressure through bowed spring washer 23 to frictionally retain the yoke in the selected position.

FIG. 1 shows the yoke 18 in its lowered, inoperative position A in which the bight portion 19 of the yoke is disposed outside of or below the periphery 13a of the filler 13 and thus is not engaged by the line 14. In this position of the yoke the line may be reeled in in the conventional steady manner by rotating the handcrank 15 at substantially constant speed. Also in this position of the yoke the line may be paid out freely from the reel.

However, as the yoke 18 is moved upwardly from its lowered inoperative position, the bight portion 19 crosses the face of the flier 13 and comes into engagement with the line 14 at some selected diametric distance above the lowered inoperative position of the yoke, depending on the extent to which the yoke has been raised. Thus, the inoperative position of the yoke is adjustable as the bight portion 19 crosses the face of the flier 13 at different levels, up to the fully raised position shown by the full lines in FIG. 3 where the lowered inoperative position is indicated by the dotted lines 18a.

When the yoke 18 is in its operative position and its bight portion 19 is engaged by the line 14, the line has a restricted path of travel to the periphery 13a of the rotating flier 13. Thus, while the flier is rotated at substantially constant speed, the line is reeled in with oscillations which produce a tugging or jerking action on the line for attracting the attention of fish. The amplitude of such oscillations may be varied by raising or lowering the yoke 18, the amplitude becoming greater when the yoke is raised and smaller when the yoke is lowered, until no oscillations are produced when the yoke in its fully lowered position is disengaged from the line.

The frictional effect of the drag means 23 is adjusted by the nut 24 so that the yoke 18 may be moved by hand but remains in a selected position. A the same time the adjustment is such that when a fish is caught on the line and the tension on the line exceeds the frictional effect of the drag means, the yoke 18 is automatically lowered to its inoperative position to permit the line to be paid out freely from the reel.

While in the foregoing there has been described and shown the preferred embodiment of the invention, various modifications and equivalents may be resorted to within the scope of the appended claims.

What is claimed is:

1. In a spinning reel of the type having a housing with a rotatable line pickup flier from the periphery of which a line extends generally in the direction of the axis of rotation of said flier; an improvement whereby the line may be reeled in with oscillations of variable amplitude while the speed of rotation of the flier is substantially constant, said improvement comprising an external yoke straddling said housing means pivotally mounting said yoke to the housing for swinging movement about an axis transverse to the axis of rotation of said flier, said yoke including a line engageable bight portion extending transversely of the flier, said yoke being swingable from an inoperative position wherein said bight portion thereof is outside the periphery of said flier and the line is not engaged therewith to an operative position wherein the bight portion crosses the face of the flier and engages the line at an adjustable diametric distance from the inoperative position to impart oscillations of a selected amplitude to the line.

2. The device as defined in claim 1 which is further characterized in that said mounting means frictionally holds said yoke in a selected position.

3. The device as defined in claim 2 which is further characterized in that the mounting means can position said yoke whereby said yoke is automatically swung from its operative to its inoperative position as a function of a predetermined amount of tension on said line.

4. The device as defined in claim 1 wherein said yoke also includes a pair of side members, said mounting means including pivot means mounting said side members on opposite sides of said housing.

5. The device as defined in claim 4 together with frictional drag means on said pivot means for frictionally holding said yoke in a selected position.

6. The device as defined in claim 5 together with means for adjusting the frictional effect of said drag means.

7. The device as defined in claim 5 which is further characterized in that the mounting means can position said yoke whereby said yoke is automatically swung from its operative to its inoperative position when tension on said line exceeds the frictional effect of said drag means.

* * * * *